United States Patent
Fleming

(10) Patent No.: US 7,106,733 B2
(45) Date of Patent: Sep. 12, 2006

(54) METHOD AND APPARATUS FOR NETWORK HEADER COMPRESSION

(75) Inventor: Kristoffer D. Fleming, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/103,385

(22) Filed: Mar. 20, 2002

(65) Prior Publication Data

US 2003/0179713 A1 Sep. 25, 2003

(51) Int. Cl.
*H04L 12/28* (2006.01)

(52) U.S. Cl. ...................... 370/389; 455/392

(58) Field of Classification Search ......... 370/392–395, 370/432–437, 460–462, 310, 204, 474, 352, 370/542, 252, 468, 465, 389, 338, 477, 337; 398/162; 375/240.15; 715/500.1; 341/107
See application file for complete search history.

(56) References Cited

U.S. PATENT DOCUMENTS

| | | | |
|---|---|---|---|
| 6,252,854 B1 * | 6/2001 | Hortensius et al. | 370/252 |
| 6,442,145 B1 * | 8/2002 | De Lange et al. | 370/310 |
| 6,539,237 B1 * | 3/2003 | Sayers et al. | 455/555 |
| 6,608,841 B1 * | 8/2003 | Koodli | 370/474 |
| 6,643,469 B1 * | 11/2003 | Gfeller et al. | 398/162 |

FOREIGN PATENT DOCUMENTS

| EP | 1 178 645 A1 | 2/2000 |
|---|---|---|
| WO | PCT/US 03/06689 | 7/2003 |

OTHER PUBLICATIONS

Khiem Le et al, Efficient and robust header compression for real–time services, Sep. 2000, Wireless Communications and Networking Conference, 2000 IEEE, vol.: 2, pp. 924–928.*
Degermark, M. et al, Evaluation of CRTP performance over cellular radio links, Aug. 2000, Personal Communications, IEEE, vol.: 7, Issue 4, pp. 20–25.*
Gfeller, F. et al, A Robust wireless infrared system with channel reciprocity, Dec. 1998, Communication Magazine, IEEE, vol. 36, Issue 12, pp. 100–106.*
C. Bormann et al., *Robust Header Compression*, Network Working Group Request for Comments: 3095, Category: Standards Track, Jul. 2001, pp. 1–168.
Burmeister,C, et al., "Robust Header Compression (ROHC): Framework and four profiles: RTP, UDP, ESP, and uncompressed", Feb. 26, 2001, pp. 1–50, Networked Working Group, INTERNET–DRAFT, (XP–002246525).
Fleming, K., et al., "Robust Header Compression (ROHC) over Wireless Ethernet Media ROHCoWEM", Oct. 28, 2002, pp. 1–14, INTERNET–DRAFT, (XP–0022465626).
Le, K., et al., "Efficient and Robust Header Compression for Real–Time Services", Sep. 23, 2000, pp. 924–928, IEEE, vol. 2.

* cited by examiner

*Primary Examiner*—Chi Pham
*Assistant Examiner*—Prenell Jones
(74) *Attorney, Agent, or Firm*—Blakely, Sokoloff, Taylor & Zafman LLP

(57) ABSTRACT

A method and apparatus for increasing the networking capacity of existing wireless networks by using robust header compression. In one embodiment, the method includes initiating a link within a wireless computer network. The method further includes transmitting data through the link using robust headers. The method may also include negotiating parameters of the link.

5 Claims, 9 Drawing Sheets

METHOD AND APPARATUS FOR NETWORK HEADER COMPRESSION

BACKGROUND OF THE INVENTION

1. Field of the Invention

The invention generally relates to wireless networks and more specifically relates to conserving bandwidth in wireless computer networks through protocol enhancement.

2. Description of the Related Art

Communication within networks of computer systems has classically used cables or other direct connections between devices. Where a processor may use a cable to communicate with a monitor, it may also use a cable (through a different interface) to communicate with another processor. The dominant form of such networks was (for some time) Ethernet. Ethernet, among other features, allowed for communication over local distances in packets typically including up to 1500 bytes and very little network overhead. What overhead did exist was considered reasonable, in light of the reliable nature of Ethernet communication.

With the advent of wireless networks, such as Bluetooth (as specified in "Specification of the Bluetooth System", Version 1.1, bearing a publication date of Feb. 22, 2001 and available from the "www.bluetooth.com" website), and Wireless IEEE 802.11 (such as is described in the ANSI/IEEE Std 802.11, 1999 edition document), a new dimension in connectivity is available. Ethernet requires ports and cables, and effectively requires a physical link between two systems for communication. Wireless networks allow communication between two systems which are coupled together without a series of physical links. Note that the term coupled generally refers to an indirect connection between two components, whereas connection or attachment generally refers to direct (physical) connection between two components. An indirect connection may rely on connection between a common intermediate component (or series of components), or may rely on coupling through a medium not evidenced by a visible connection, such as through electromagnetic radiation for example.

With wireless networks, two devices may be linked or coupled through the wireless network, and have flexibility in terms of physical positioning. Wireless networks depend on transmission of electromagnetic waves, which can require much power. Thus, the more transmission which must occur, the more power and other resources of the system must be devoted to transmission and away from other productive uses.

BRIEF DESCRIPTION OF THE DRAWINGS

Embodiments of the present invention are illustrated by way of example and not limitation in the accompanying figures.

DETAILED DESCRIPTION

Figure 1:
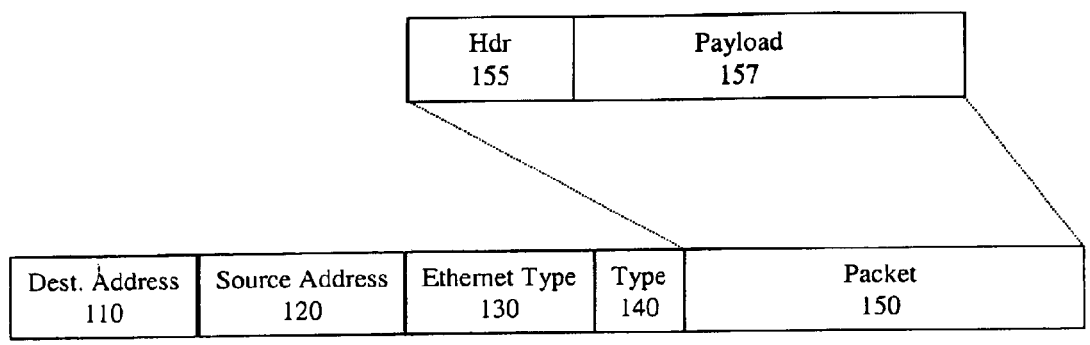
FIG. 1 illustrates an embodiment of a packet.

A method and apparatus for increasing the networking capacity of existing wireless networks by using robust header compression is described. In the following description, for purposes of explanation, numerous specific details are set forth in order to provide a thorough understanding of the invention in some of its various embodiments. It will be apparent, however, to one skilled in the art that the invention can, in some embodiments, be practiced without these specific details. In other instances, structures and devices are shown in block diagram form in order to avoid obscuring the invention in the embodiments illustrated.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, the invention is a method. The method includes initiating a link within a wireless computer network. The method further includes transmitting data through the link using robust headers. The method may also include negotiating parameters of the link.

Negotiating parameters may include sending an initial packet having a set of parameters for transmission of data, and receiving a first responsive packet having confirmation of the set of parameters for transmission of data. Negotiating parameters may also include receiving a second responsive packet having the set of parameters for transmission of data wherein one or more of the parameters of the set of parameters are modified. Negotiating parameters may further include sending a second packet responsive to the second responsive packet, the second packet having the set of parameters for transmission of data as modified in the responsive packet.

The method may also include receiving a packet from a system, transforming a header of the packet into a robust header, and providing the packet as transformed for transmission. Transforming a header into a robust header may include stripping the header from the packet, encoding necessary portions of the header into the robust header, and prepending the robust header to the packet.

In an alternate embodiment, the invention is also a method. The method includes receving a request for a link within a wireless computer network. The method also includes receiving data through the link using robust headers. The method may further include negotiating parameters of the link.

Negotiating parameters may include sending an initial packet having a set of parameters for transmission of data. Negotiating parameters may also include receiving a first responsive packet having the set of parameters for transmission of data wherein one or more of the parameters of the set of parameters are modified. Negotiating parameters may further include sending a second packet responsive to the first responsive packet, the second packet having the set of parameters for transmission of data as modified in the first responsive packet. Negotiating parameters may also include receiving a second responsive packet having confirmation of the set of parameters for transmission of data.

The method may further include receiving a packet from a system, transforming a header of the packet into a robust header, and providing the packet as transformed for transmission. Transforming a robust header into a header may include stripping the robust header from the packet, decoding the robust header, filling data of the header from default data for the transmission, filling data of the header from data decoded from the robust header, and prepending the header to the packet.

In another alternate embodiment, the invention is also a method. The method includes initiating a link within a wireless computer network. The method also includes transmitting data through the link in packets, the packets having headers, the headers including only unpredictable parameters. The method may further include compressing the headers and/or the packets. The method may also further include negotiating parameters of the link.

FIG. 1 illustrates an embodiment of a packet. The packet is typical of Ethernet systems, as used under the IEEE 802.3 standard (such as IEEE 802.3, 2000 Edition {ISO/IEC 8802-3: 2000}). Packet 100 includes destination address 110, source address 120, Ethernet type 130, robust header type 140 and data packet 150. Data packet 150 is further subdivided into robust header 152 and payload 157.

Packet 100 illustrates an embodiment of an Ethernet-style packet utilizing a robust header. Typically, data packet 150 is 1500 bytes long in traditional Ethernet, and reasons such as backward compatibility may result in maintenance of this size after the original technological reasons no longer exist. Of the fields illustrated, destination address 110, source address 120 and Ethernet type 130 all are required to operate in an Ethernet environment, and are provided by the Ethernet interface in one way or another. Robust header type 140 may be a field which provides a type of packet used in the robust header implementation, such as a packet containing data to be transmitted, or a packet containing parameter negotiation information to be used to determine how data may be transmitted. Data packet 150 contains both the header information (in header 152) and the data to be transmitted (in payload 157). In the case of a negotiation packet, the payload would contain parameters setting forth values for predetermined control variables of a compression or decompression engine, or some similar type of information.

Figure 2:
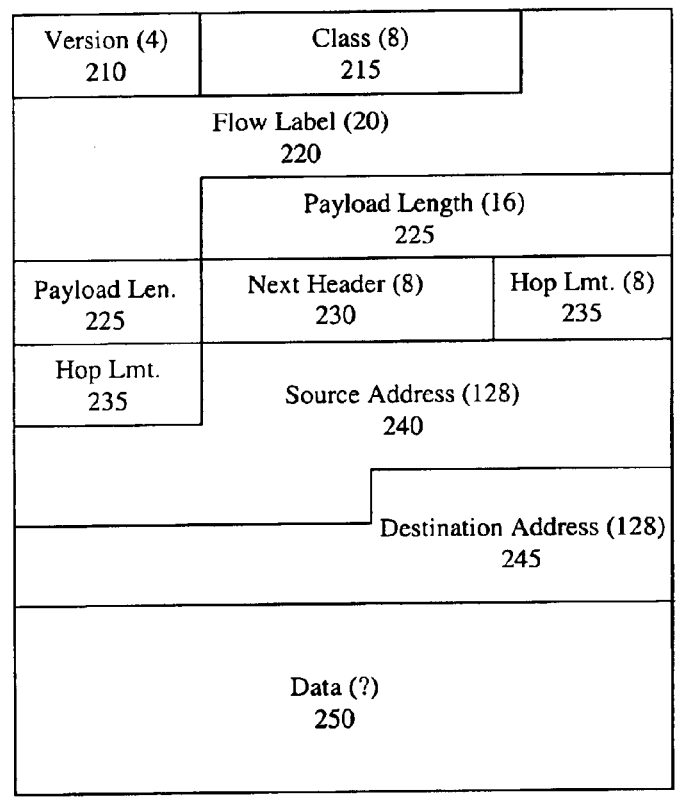
FIG. 2 illustrates an alternate embodiment of a packet.

FIG. 2 illustrates an alternate embodiment of a packet. Most of the fields illustrated in this embodiment are header (or overhead) fields of one form or another. The header includes version 210, class 215, flow label 220, payload length 225, next header 230, hop limit 235, source address 240, destination address 245, and data (or payload) 250. Note that each field includes a number in parentheses indicating the length of that field in bits. Summing the lengths of these fields, it becomes apparent that 320 bits (40 bytes) are required to transmit a packet using this embodiment. If the payload of the packet is 1460 bytes (1500−40) then this may be an acceptable amount of overhead. However, many applications use small payloads, possibly on the order of 20–100 bytes. In these cases, a 40 byte header is a severe overhead requirement. Furthermore, in wireless environments, each byte transmitted requires power to transmit which varies over time, as components of the network shift physical locations (such as a laptop moving with its owner within a room for example). Thus, minimizing overhead can be particularly valuable.

Exemplary applications which use small packets include streaming audio and video, voice-over-IP (or similar voice/telephony related applications for example), and collaborative applications (document review, presentation for example). As will be appreciated, many other applications may have similar use of small packets. For these applications, minimizing overhead can be very useful as described above. The robust compression methodology includes providing a first header which includes information on each parameter that would normally be in a header, and then providing change information about parameters in successive headers. Thus, the first header may include a list of parameters and initialization values, and then succeeding headers may include only the information about parameters that have changed in an unpredictable way and information about parameters that were known to require transmission with a packet. Furthermore, the first header may include information about the type of parameters and the expected behavior of parameters, or that information may be included in a negotiation packet. As will be appreciated, the first header may also be included in a negotiation packet, rather than being the first header for a true data packet. Furthermore, as will be appreciated, data packets will typically be compressed, whereas negotiation packets will typically not be compressed.

Figure 3:
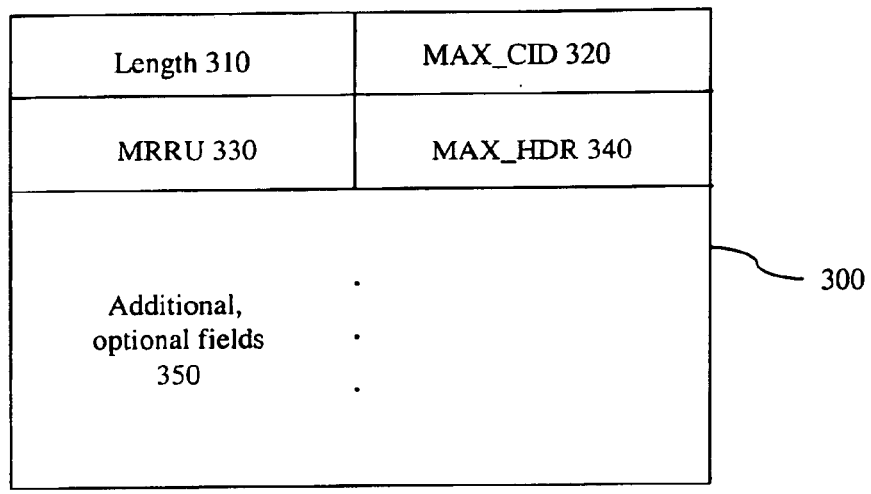
FIG. 3 illustrates an embodiment of a negotiation packet.

FIG. 3 illustrates an embodiment of a negotiation packet. The negotiation packet 300 includes a length field 310, MAX_CID field 320, MRRU field 330, MAX_HDR field 340, and additional optional fields 350. The length field 310 indicates the length of the negotiation packet 300. The MAX_CID field 320 indicates the maximum size of the Channel Identifier used in some wireless networks to indicate a destination or source within a system. The MRRU field 330 indicates the size of the maximum reconstructed reception unit. The MAX_HDR field indicates the maximum size of the header within the packets containing data for transmission. These fields thus set the stage for transmission.

As indicated previously, other fields may be included in the negotiation packet 300. These fields may include initialization information for the data transfer, and may also include further identification information. Such initiation information may include a list of fields and the expected behavior (or type) of the fields. Expected behavior may include constant (the field does not change), increasing (field increases in a predetermined manner, such as a counter), irregular (field changes in an unpredictable manner), and other forms of expected behavior. As will be appreciated, both sides of the negotiation begin with a common understanding of what fields may be included and what types of behavior may be expected, and the initiation information merely provides specific information for a specific data transfer.

Thus, a source address may be expected to be constant, a packet count may be expected to increase by one each time a packet is sent, and a timestamp may be expected to change unpredictably. In one embodiment, the source address and count would only be sent in the first packet, while the timestamp is sent in every packet. Alternately, if the packet count or source address changes for a data transmission, this information may be included in a successive packet, such as by including in the header of the successive packet a name of a parameter and a new value. In general, only those parameters which change unpredictably are necessary for inclusion in a data packet header using robust compression. Under normal operation, the receiver of the compressed packets will use the initialization values and internal state information about the data transfer to recreate an expected header which may then be used internally within the receiver system.

Furthermore, as will be appreciated, fields in a negotiation packet may vary in size, number, and order depending on the specific circumstances of the negotiation and surrounding systems. As such, the embodiment illustrated in FIG. 3 is exemplary, and indicates one possibility suitable for some systems and some negotiations. One variant of negotiations involves what types of transfers are supported. If only one protocol is supported (or mandated), then some assumptions may be made about that protocol and incorporated into a negotiation. However, the negotiation packet may specify one of a group of potentially available protocols, for example, or other variants suitable for negotiation.

Figure 4:
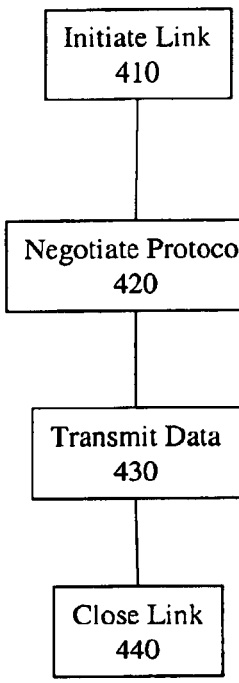
FIG. 4 illustrates an embodiment of a method of utilizing a link.

FIG. 4 illustrates an embodiment of a method of utilizing a link. As will be appreciated, initiation of a link may depend on an initiator of some form (such as a part of a system associated with wireless data transfers) recognizing that data transfer is occurring which may advantageously use robust header compression. In some embodiments, an application level or operating system level program or object may affirmatively request robust header compression. In other embodiments, a robust header layer may analyze data presented for transmission and make determinations about whether to engage in robust header compression. In one embodiment, the link is initiated through use of uncompressed packets for negotiation purposes. Following that, the established link uses compressed packets for data transfer purposes. Reset of the link may involve a switch back to uncompressed packets as will be discussed hereafter.

At block 410, the link is initiated, such as by sending a negotiation packet to an expected destination. At block 420, negotiation between the recipient and the sender occurs, during which the recipient and sender attempt to agree on a protocol for use based on capabilities of the recipient and sender. Such negotiation typically involves the exchange of at least one set of negotiation packets which specify parameters of the data transfer. At block 430, data is transmitted, accomplishing the desired result, such as providing streaming video to a consumer for example. At block 440, the link is closed, as data transfer is complete or one side is abandoning the link.

Figures 5A, 5B:
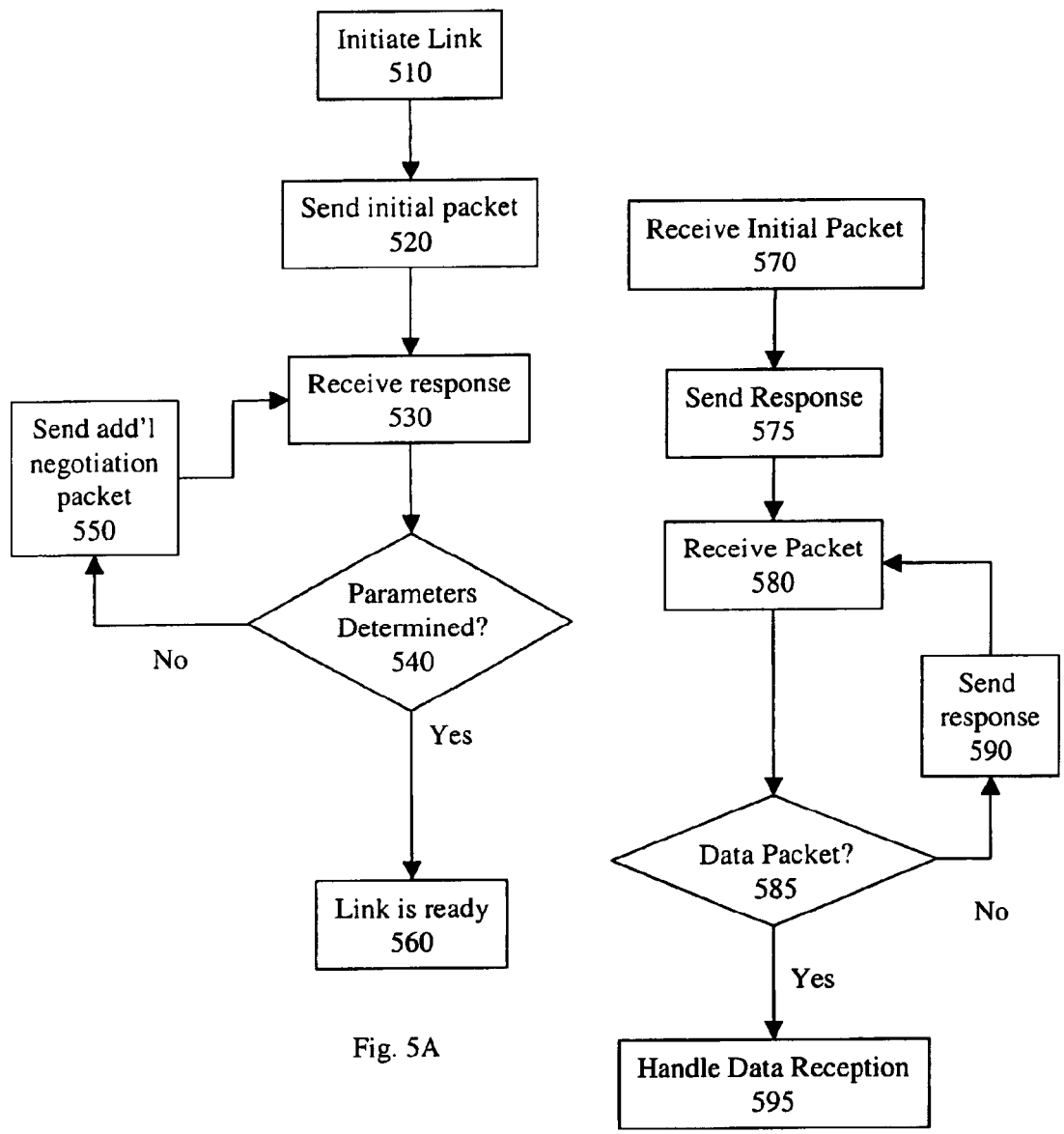
FIG. 5A illustrates an embodiment of a method of initiating a link for transmission.
FIG. 5B illustrates an embodiment of a method of initiating a link for reception.

As will be appreciated, most links require an initiation process. FIG. 5A illustrates an embodiment of a method of initiating a link for transmission. At block 510, the link is initiated within a sending system, such as determining that a link is desired and determining basic parameters for data transfer (such as type of data to be transferred, medium to use, for example). At block 520, an initial packet is sent (or broadcast) to a potential recipient. This initial packet may be a negotiation packet, or may simply be a packet requesting an opportunity to negotiate a link. At block 530, a response (preferably in the form of a responsive packet) is received by the sender. At block 540, a determination is made as to whether the link is ready, which may include whether parameters have all been determined and agreed on, whether data is available, and other factors. At block 550, if the link is not ready, an additional negotiation packet is sent to further determine the nature of the data transfer and link. Thereafter, the process returns to block 530. If the link was ready at block 540, then at block 560, a determination that the link is ready is made available to the sending system (the system may then send compressed data).

FIG. 5B illustrates an embodiment of a method of initiating a link for reception. At block 570, an initial packet is received via a potential link. At block 575, a responsive packet is sent. The responsive packet may include expected parameters of the data transfer, an acknowledgment of receipt, or some other information (such as a denial of willingness to initiate the link for example). At block 580, another packet, such as a negotiation packet is received. At block 585, a determination is made as to whether the packet just received was a data packet (and thus that data transmission has begun) or whether the packet just received was a negotiation packet (potentially necessitating a response). If the packet just received was a negotiation packet, then a responsive packet (including confirmation of receipt and/or counter-proposing parameters for example) is sent at block 590, and the process returns to block 580 to receive another packet. If, at block 585, the packet just received was a data packet, then receipt of that data packet is handled by the system based on the parameters of the link at block 595.

Figure 6A:
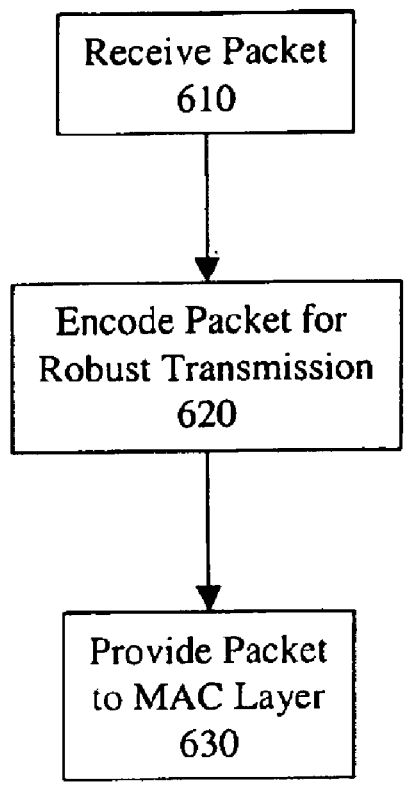
FIG. 6A illustrates an embodiment of a method of transmitting data over a link.

FIG. 6A illustrates an embodiment of a method of transmitting data over a link. At block 610, a packet is received for transmission by the robust header portion of the system. The packet may be expected to be in a form traditionally used to transmit the packet based on a protocol used by the system. At block 620, the robust header portion of the system encodes the packet for robust header compression and transmission, such as by stripping out unnecessary data, reformatting header information, and compressing information where possible. At block 630, the packet as transformed is provided to a Media Access Control (MAC) layer of the system, for transmission via the expected medium. Note that the packet provided to the MAC layer will include a type indicating that it is of robust header compressed type (such as type 140 of FIG. 1 for example), along with the actual packet. The MAC layer may then be expected to add the Ethernet type (such as Ethernet type 130 of FIG. 1 for example) and Ethernet source (source address 120 of FIG. 1 for example) and destination (destination address 110 of FIG. 1 for example) fields (which may be supplied separately to the MAC layer for example).

Figure 6B:
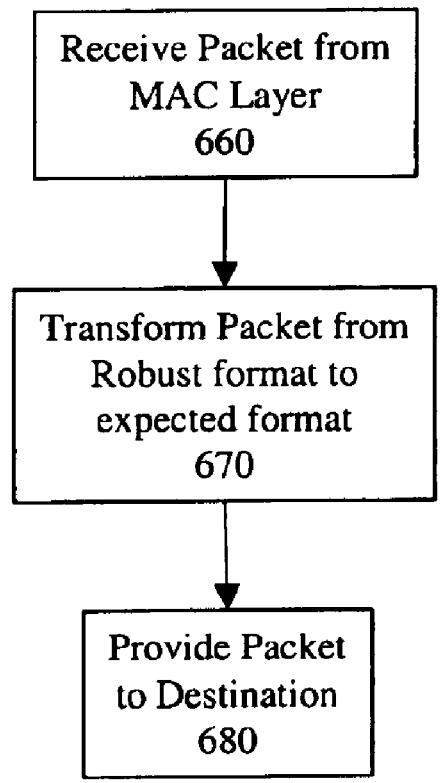
FIG. 6B illustrates an embodiment of a method of receiving data over a link.

FIG. 6B illustrates an embodiment of a method of receiving data over a link. At block 660, a packet is received from the MAC layer in a receiving system. At block 670, the packet is transformed from one having a robust compressed header to one having a conventional header for the expected transmission protocol. Such transformation may include stripping the robust header and prepending a header with expected or generated values of parameters and values received from the packet provided by the MAC layer for example. At block 680, the transformed packet is provided to the destination within the receiving system.

As will be appreciated, the link may 'break' or otherwise become non-functional or unsynchronized. This may prove to be a permanent break as regards a data transfer (the antenna physically breaks for example) or a temporary break, such as random short-term interference for example. If a temporary break occurs, the preferable behavior would be a reset of some form. To accomplish this, the system may stop sending data packets, and send uncompressed negotiation packets to initiate transmission over again. This may not only be suitable for problems in the link caused by random or unpredictable events, it may also be suitable in situations involving links proving to be unreliable. Whether a link is simply unreliable or is merely subject to a random one-time interference issue may not be determinable from the systems using the link.

As such, the systems may re-negotiate the link, possibly using a different protocol and different parameters as a result of apparent disruptions. It will be appreciated that existing protocols for transmission would be used, with compressed headers and data, and that those existing protocols may include mechanisms for handling retry or NO_ACK (no acknowledgment) situations. However, the parameters surrounding those mechanisms may be subject to negotiation, along with other parameters of a protocol which may otherwise be pre-defined.

Figure 7:
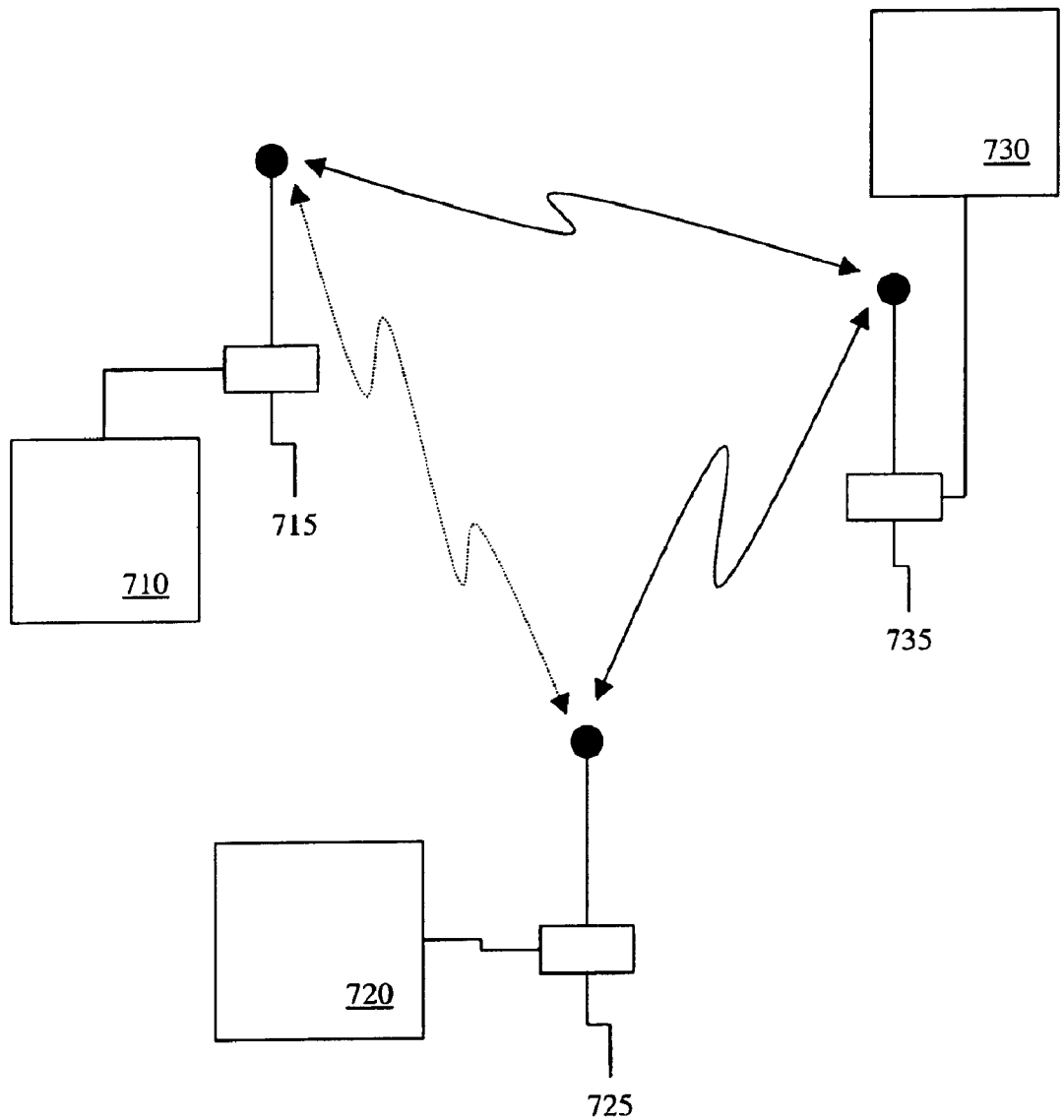
FIG. 7 illustrates an embodiment of a wireless network.

FIG. 7 illustrates an embodiment of a wireless network. Device 710 is a system, such as a computer or other machine, which is coupled to device 715. Device 715 includes a wireless interface to a wireless network, such as an antenna and corresponding circuitry. Device 720 is another system, such as a computer, printer, handheld device, or other machine, which is coupled to device 725. Device 725 also includes a wireless interface to a wireless network, such as an antenna and corresponding circuitry. Device 730 is yet another system, such as a computer or handheld device for example, which is coupled to device 735. Device 735 also includes a wireless interface to a wireless network, such as an antenna and corresponding circuitry.

Note that in one embodiment of the wireless network, device 730 communicates with device 720 and device 710. However, device 710 (such as a printer for example) does not communicate directly with device 730 (such as a handheld for example). The link illustrated between device 715 and device 725 illustrates that data may be broadcast from device 715 to device 725, even though the associated devices 710 and 720 are not communicating directly, and the data in question may not be addressed to the receiving device.

Figure 8:
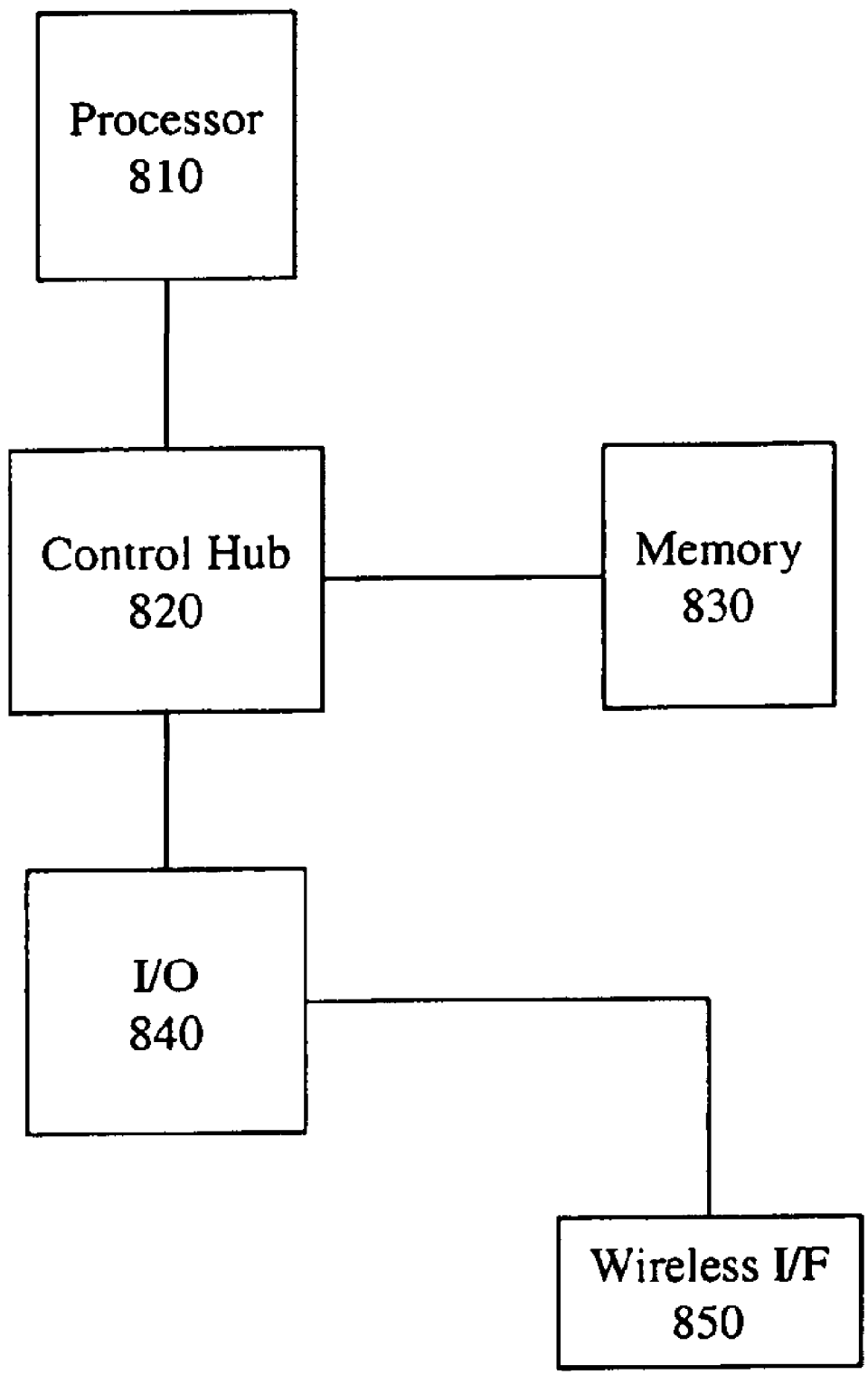
FIG. 8 illustrates an embodiment of a system.

FIG. 8 illustrates an embodiment of a system. Processor 810 may be a microprocessor or similar device (microcontroller, digital signal processor, etc.). Coupled to processor 810 is control hub 820, which may control access to the processor 810 and to other components. Coupled to control hub 820 is memory 830, which, in some embodiments, may store instructions and data for use by processor 810 and other portions of the system. Also coupled to control hub 820 is I/O hub 840, which may control input/output interfaces of the system and regulate data flow between the input/output subsystems or interfaces and the processor for example. Coupled to I/O hub 840 is wireless interface 850, such as a Bluetooth, Wireless IEEE 802.11, or Ultra Wideband antenna and associated circuitry, or other wireless interface suitable for use by a computer. Wireless interface 850 may be used for transmitting and receiving data through use of a wireless LAN (local area network) or PAN (personal area network) for example. Wireless interface 850, in alternate embodiments, may be an interface within a system which may be coupled to or connected to a Bluetooth, Wireless IEEE 802.11, or Ultra Wideband antenna and associated circuitry, or other wireless interface suitable for use by a computer.

Figure 9A:
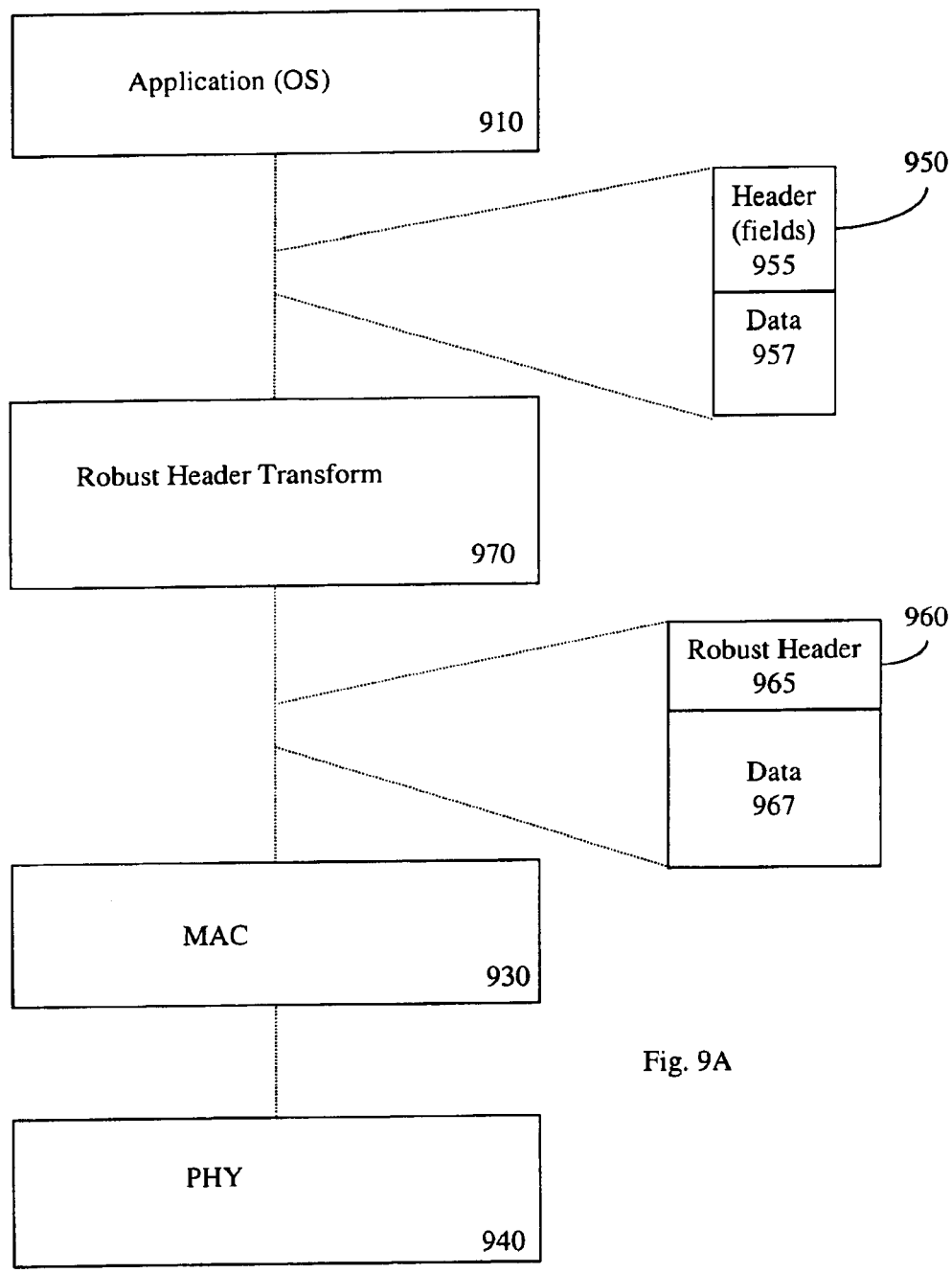
FIG. 9A illustrates an alternate embodiment of a system.

FIG. 9A illustrates an alternate embodiment of a system. Layer 910 is an application or operating system layer, which may provide and receive packets in standard protocols for use in wireless transmissions. A packet 950, including header fields 955 and data 957 may be exchanged between layer 910 and robust header layer 920. Robust header layer 970 transforms packets between the robust header format(s) and standard formats, such as by stripping and encoding a traditional header or recreating a traditional header from a robust header. Robust header layer 970 provides packets such as packet 960 to MAC layer 930. Packet 960 includes robust header 965 and data 967. Note that data 967 and data 957 may be identical, or data 967 may be a compressed version of data 957 for example. MAC layer 930 provides data in a suitable format to PHY (physical access) layer 940, which actually sends or receives data through the wireless network. Robust header layer 970 may be expected to handle receipt of packets from layer 910, transformation (encoding) of packets for robust header compression purposes, initiation and negotiation of links, receipt of packets from MAC layer 930, and transformation (decoding) of packets from robust header compression format to a suitable internal format.

Figure 9B:
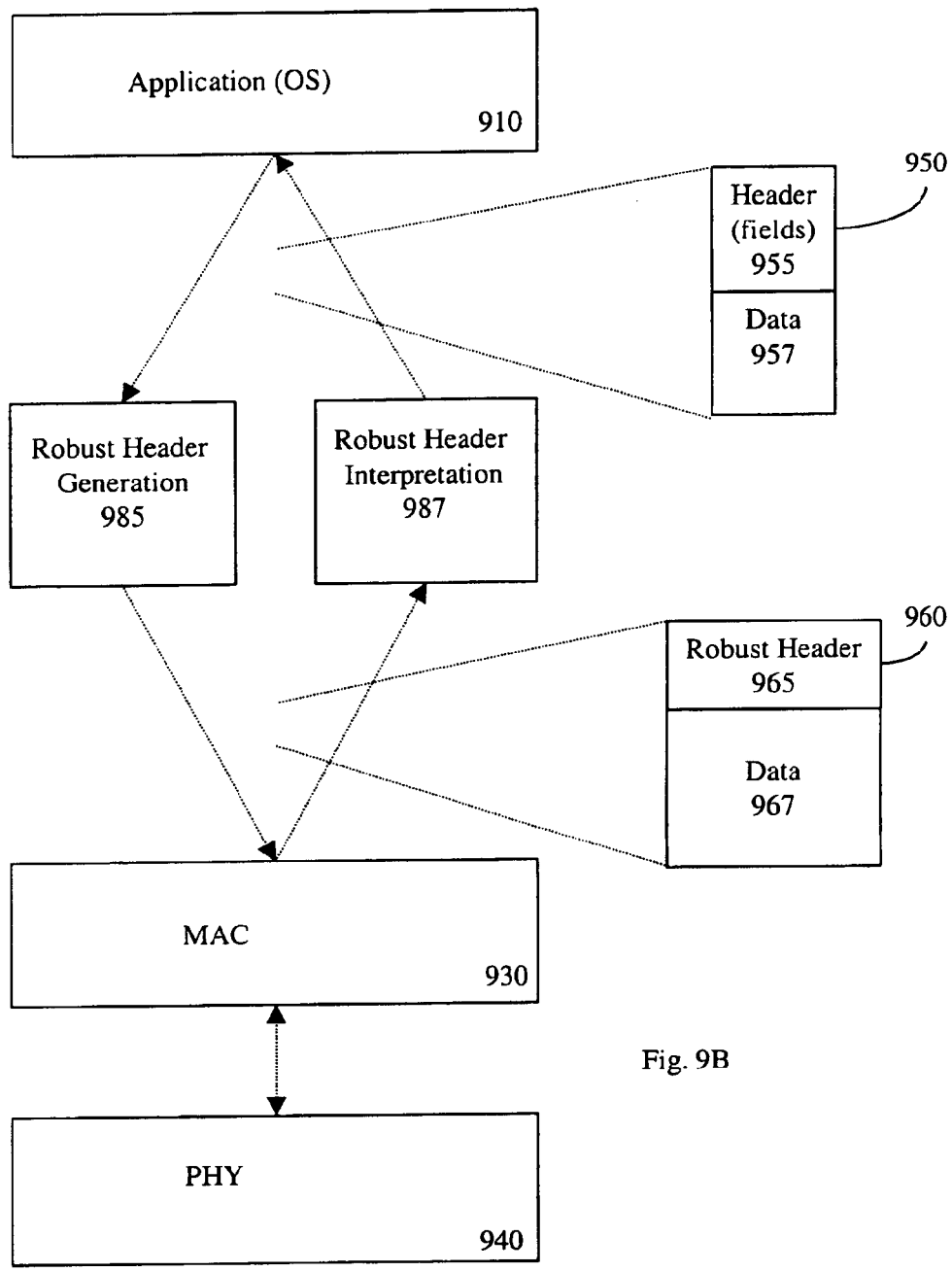
FIG. 9B illustrates another alternate embodiment of a system.

FIG. 9B illustrates another alternate embodiment of a system. Layer 910 is an application program layer, which may provide and receive packets in standard protocols for use in wireless transmissions. A packet 950, including header fields 955 and data 957 may be exchanged between layer 910 and either of robust header generation layer 985 or robust header interpretation layer 987. Robust header generation layer 985 generates robust headers from traditional headers by stripping the traditional header and encoding necessary parameters into a robust compressed header. Robust header interpretation layer 987 interprets robust compressed headers in received packets to generate traditional headers for use by layer 910. Robust header generation layer 985 provides packets such as packet 960 to MAC layer 930, and robust header interpretation layer 987 receives packets such as packet 960. Packet 960 includes robust header 965 and data 967. Note that data 967 and data 957 may be identical, or data 967 may be a compressed version of data 957 for example. MAC layer 930 provides data in a suitable format to PHY (physical access) layer 940, which actually sends or receives data through the wireless network. Robust header interpretation layer 987 may be expected to handle negotiations for receiving data via a link, while robust header generation layer 985 may be expected to handle negotiations for sending data via a link, and initiation of a link.

Figure 9C:
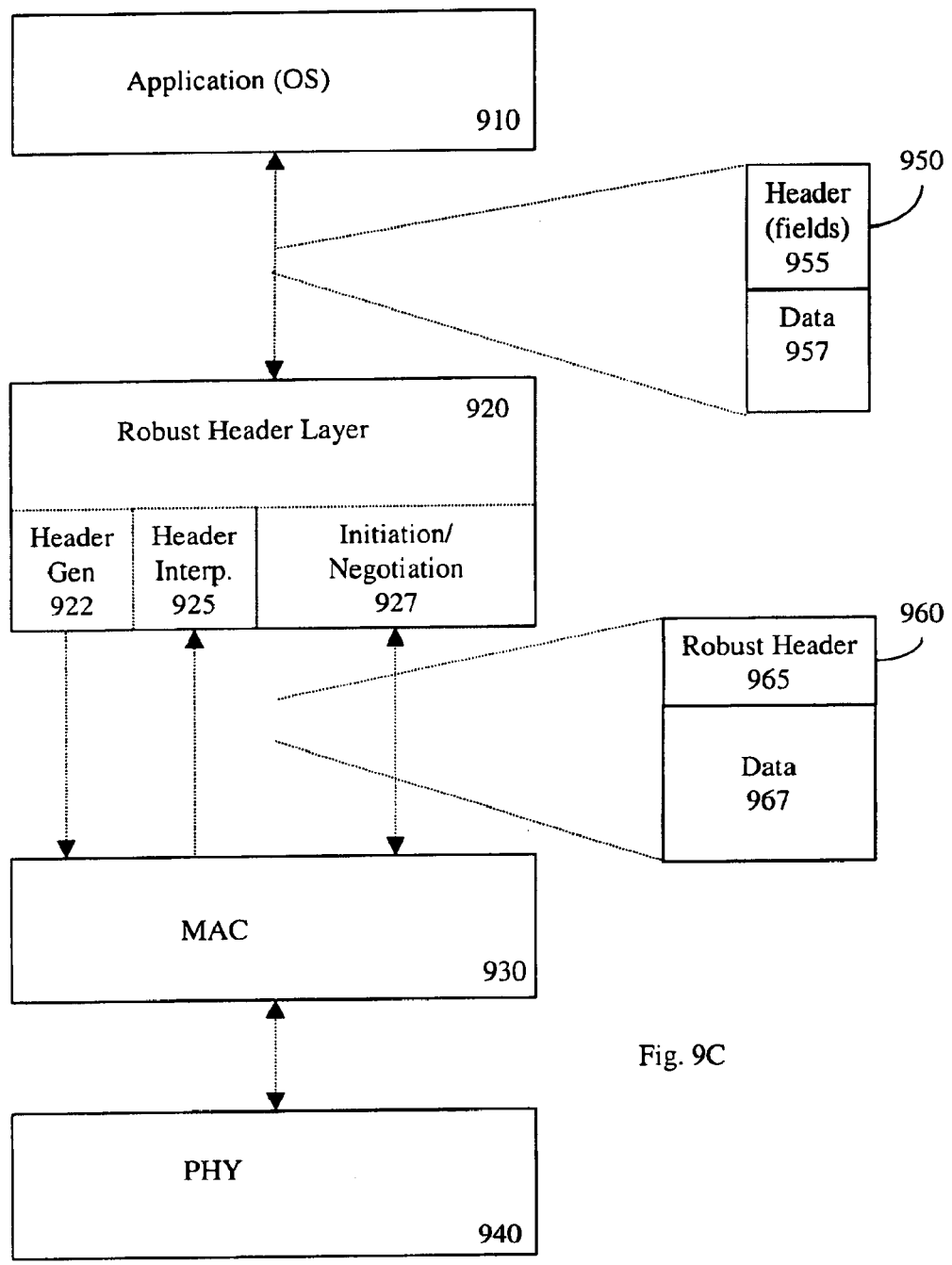
FIG. 9C illustrates yet another alternate embodiment of a system.

FIG. 9C illustrates yet another alternate embodiment of a system. Layer 910 is a layer within the system, which may provide and receive packets in standard protocols for use in wireless transmissions. A packet 950, including header fields 955 and data 957 may be exchanged between layer 910 and robust header layer 920. Robust header layer 920 includes robust header generation module 922, robust header interpretation module 925 and initiation/negotiation module 927. Robust header generation module 922 generates robust headers from traditional headers by stripping the traditional header and encoding necessary parameters into a robust compressed header. Robust header interpretation module 925 interprets robust compressed headers in received packets to generate traditional headers for use by layer 910. Initiation/negotiation module 927 initiates and negotiates the parameters of data transmissions. Robust header generation layer 922 provides packets such as packet 960 to MAC layer 930, and robust header interpretation layer 925 receives packets such as packet 960. Initiation/negotiation module 927 may provide and receive packets such as packet 960 to MAC layer 930, and may provide and receive other packets more suited to negotiation, too. Packet 960 includes robust header 965 and data 967. Note that data 967 and data 957 may be identical, or data 967 may be a compressed version of data 957 for example. MAC layer 930 provides data in a suitable format to PHY (physical access) layer 940, which actually sends or receives data through the wireless network.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

In particular, the layers of FIGS. 9A, 9B and 9C may be implemented as modules or sets of modules of instructions, which, when executed by a processor, cause the processor to perform operations or tasks. Moreover, these instructions may be embodied in media, either in a single medium (or article of a particular media) or in multiple media as appropriate. Such media need not be limited to the magnetic or optical media mentioned above, and may further include transitory media such as carrier waves having signals impressed thereon for example.

In the foregoing detailed description, the method and apparatus of the present invention has been described with reference to specific exemplary embodiments thereof. It will, however, be evident that various modifications and changes may be made thereto without departing from the broader spirit and scope of the present invention, that specific exemplary embodiments are not limiting on the scope of the present invention. In particular, the separate blocks of the various block diagrams represent functional blocks of methods or apparatuses and are not necessarily indicative of physical or logical separations or of an order of operation inherent in the spirit and scope of the present invention, though they may reflect specific embodiments. For example, the various blocks of FIG. 9A may be integrated into components, or may be subdivided into components. Similarly, the blocks of FIG. 5A (for example) represent portions of a method which, in some embodiments, may be reordered or may be organized in parallel rather than in a linear fashion. The present specification and figures are accordingly to be regarded as illustrative rather than restrictive.

What is claimed is:

1. A system comprising:

a processor;

a control hub coupled to the processor;

a memory coupled to the control hub;

an input/output hub coupled to the control hub;

a wireless network interface coupled to the input/output hub; and wherein:

the processor to:

initiate a link within an existing wireless computer network through the wireless network interface, the existing wireless computer network transmitting data via Ethernet packets;

negotiate parameters of the link; and transmit data through the link and the wireless network interface using robust header compression on Ethernet packets in the wireless network wherein a header is transformed into a robust header by stripping the header from the packet, encoding only unpredictable portions of the header into the robust header, and prepending the robust header to the packet.

2. The system of claim 1 wherein the processor further to:

receive a packet from the system;

transform a header of the packet into a robust header; and provide the packet as transformed for transmission by the wireless network interface.

3. A system comprising:

a processor;

a control hub coupled to the processor;

a memory coupled to the control hub;

an input/output hub coupled to the control hub;

a wireless network interface coupled to the input/output hub; and wherein:

the processor to:

initiate a link within an existing wireless computer network through the wireless network interface, the existing wireless computer network transmitting data via Ethernet packets; and transmit data through the link in packets using robust header compression on Ethernet packets in the wireless network, the packets having headers, the headers having only unpredictable parameters included therein wherein a packet is received from the system, a header is stripped from the packet, only unpredictable portions of the header are encoded into a robust header, and the robust header is prepended to the packet.

4. The system of claim 3 wherein the processor further to:

negotiate parameters of the link.

5. The system of claim 4 further comprising:

provide the packet as transformed for transmission by the wireless network interface.

* * * * *